United States Patent
Chi et al.

(10) Patent No.: US 10,678,414 B2
(45) Date of Patent: *Jun. 9, 2020

(54) ADJUSTING VALUES OF A PLURALITY OF CONDITIONS

(71) Applicant: International Business Machines Corporation, Armonk, NY (US)

(72) Inventors: Jian Wen Chi, Shanghai (CN); Fang Liang Dong, Shanghai (CN); Rong Rong Gong, Shanghai (CN); Lin Ying Ying, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 311 days.

This patent is subject to a terminal disclaimer.

(21) Appl. No.: 15/452,881

(22) Filed: Mar. 8, 2017

(65) Prior Publication Data

US 2017/0177202 A1 Jun. 22, 2017

Related U.S. Application Data

(63) Continuation of application No. 14/156,715, filed on Jan. 16, 2014, now Pat. No. 9,665,271.

(30) Foreign Application Priority Data

Jan. 30, 2013 (CN) .......................... 2013 1 0035320

(51) Int. Cl.
  *G06F 3/0484* (2013.01)
  *G06F 3/0488* (2013.01)
  *G06T 11/20* (2006.01)

(52) U.S. Cl.
  CPC ...... *G06F 3/04847* (2013.01); *G06F 3/04883* (2013.01); *G06T 11/206* (2013.01); *G06F 2203/04808* (2013.01)

(58) Field of Classification Search
  None
  See application file for complete search history.

(56) References Cited

U.S. PATENT DOCUMENTS 7,962,478 B2   6/2011  Garbow et al.
8,830,225 B1 * 9/2014  Karakotsios .............. G06T 3/60
                                                          345/419

(Continued)

FOREIGN PATENT DOCUMENTS

CN   101482795 A   7/2009
CN   102479052 A   5/2012

(Continued)

OTHER PUBLICATIONS

Anonymous, "Ebay Finding API Users Guide", Ebay, Inc., <http://developer.ebay.com/devzone/finding/Concepts/FindingAPIGuide.html>, Retrieved January 16, 2014, pp. 1-24.

(Continued)

*Primary Examiner* — Tuan S Nguyen
(74) *Attorney, Agent, or Firm* — Yee & Associates, P.C.

(57) ABSTRACT

A method, system, and/or computer program product adjust values of a plurality of conditions. A processor receives a user input, which is a movement across a user interface. A tendency of the movement, which describes a direction and velocity of the movement, is determined. According to the tendency of the movement, a processor adjusts a value of at least one of the plurality of conditions by using a plurality of graphs representing the plurality of conditions, where the plurality of conditions describe search criteria, and where the user input describes the search criteria.

15 Claims, 4 Drawing Sheets

(56) References Cited

U.S. PATENT DOCUMENTS

| | | | |
|---|---|---|---|
| 2006/0095283 A1* | 5/2006 | Matsumoto | G06Q 40/04 705/1.1 |
| 2008/0082512 A1 | 4/2008 | Haug et al. | |
| 2011/0307813 A1 | 12/2011 | Bakalov et al. | |
| 2012/0059820 A1 | 3/2012 | Lakshmanan et al. | |
| 2012/0092267 A1 | 4/2012 | Haug | |
| 2012/0223880 A1* | 9/2012 | Birnbaum | G06F 3/015 345/156 |
| 2014/0136381 A1 | 5/2014 | Joseph et al. | |
| 2015/0205516 A1* | 7/2015 | Kuscher | G06F 3/04883 715/708 |

FOREIGN PATENT DOCUMENTS

| | | |
|---|---|---|
| CN | 102830917 A | 12/2012 |
| WO | 2008135813 A1 | 11/2008 |
| WO | 2009079153 A1 | 6/2009 |
| WO | 2010135342 A1 | 11/2010 |

OTHER PUBLICATIONS

List of IBM Patents or Patent Applications Treated as Related. Mar. 7, 2017.

* cited by examiner

ADJUSTING VALUES OF A PLURALITY OF CONDITIONS

BACKGROUND

The present invention relates to information processing, and more particularly, to a method and system for adjusting values of a plurality of conditions.

With the exponential growth of information, finding the right information has much challenge than ever. A user expects to find desired information more rapidly and accurately, but some existing solutions are unable to meet the user's expectations. Normally, a user uses interface elements such as checkboxes, radio buttons, pull-down menus, sliders, and through multiple repeated operations, finally filters out information close to what he/she desires. However, when there are a plurality of conditions (i.e., search criteria) that must be met, these operations will be more inefficient and time-consuming. In addition, current solutions are unable to adjust values of a plurality of conditions simultaneously.

SUMMARY

A method, system, and/or computer program product adjust values of a plurality of conditions. A processor receives a user input, which is a movement across a user interface. A tendency of the movement, which describes a direction and velocity of the movement, is determined. According to the tendency of the movement, a processor adjusts a value of at least one of the plurality of conditions by using a plurality of graphs representing the plurality of conditions, where the plurality of conditions describe search criteria, and where the user input describes the search criteria.

BRIEF DESCRIPTION OF THE SEVERAL VIEWS OF THE DRAWINGS

The above and other objects, features and advantages of the present disclosure will become more apparent through the more detailed description of illustrative embodiments of the present disclosure when read in conjunction with the accompanying drawings, in which like reference numerals generally refer to like components in embodiments of the present disclosure.

DETAILED DESCRIPTION

Figure 1:
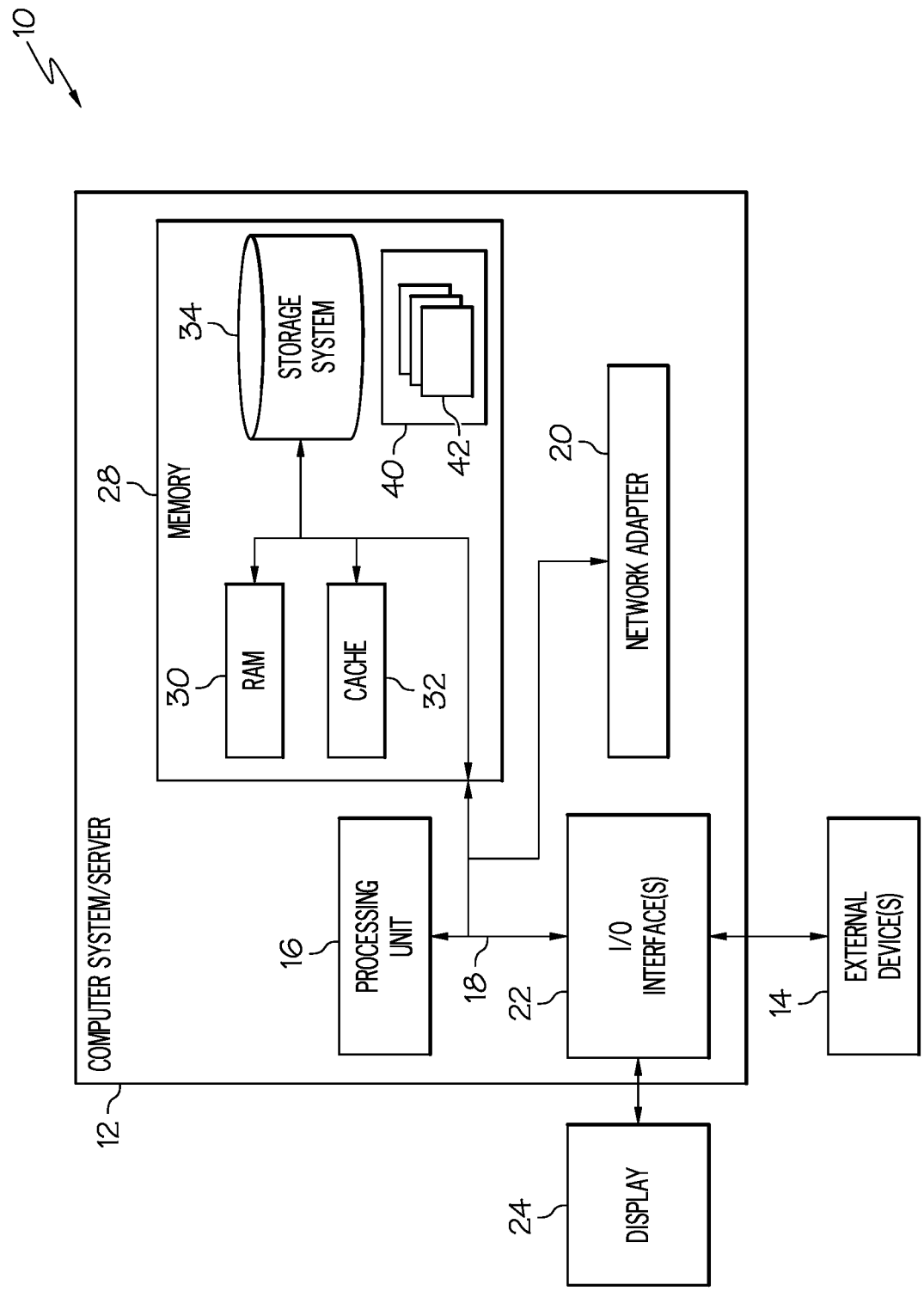
FIG. 1 shows a block diagram of an exemplary computer system/server 12 which is applicable to implement embodiments of the present invention.

Preferred embodiments will be described in more detail with reference to the accompanying drawings, in which the preferred embodiments of the present disclosure have been illustrated. However, the present disclosure can be implemented in various manners, and should not be construed to be limited to the embodiments disclosed herein. On the contrary, these embodiments are only provided for a thorough and complete understanding of the present disclosure, and fully conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and include volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Apart from the traditional computer system/server 12 as shown in FIG. 1, what is suitable for implement embodiments of the present invention may further comprise mobile electronic devices, including but not limited to mobile phones, PDAs, tablet PC, etc. Typically, a mobile electronic device has an input device, including but not limited to a touch input device, e.g., a touch screen, a touch pad, etc.

Figure 2:
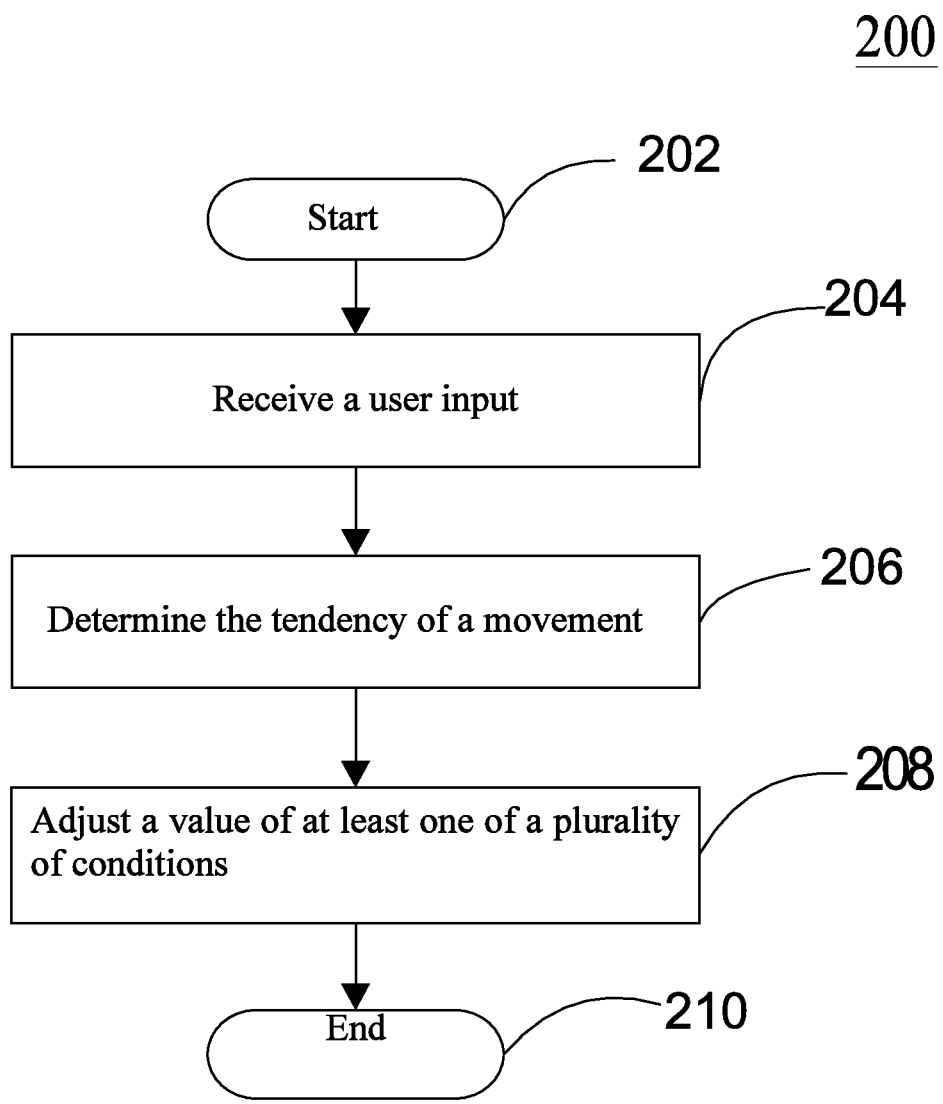
FIG. 2 shows a flowchart of method 200 for adjusting values of a plurality of conditions according to an embodiment of the present invention.

Referring to FIG. 2, a flowchart of a method 200 for adjusting values of a plurality of conditions according to an embodiment of the present invention is shown. Method 200 starts from step 202; next, method 200 proceeds to step 204 to receive a user input, which is a movement. According to an embodiment of the present invention, the user input may be input by a touch input device such as a touch screen, a touch pad and the like. According to an embodiment of the present invention, a user input refers to a movement of a user's fingers; according to an embodiment of the present invention, the user movement may be movements of a user's plurality of fingers. According to an embodiment of the present invention, the user movement may be a movement of a pen which is used as an input device. The user input may be received through a touch input device such as a touch screen and a touch pad, by using various known technical means, which is not repeated here.

Next, method 200 proceeds to step 206, in which the tendency of the movement is determined. The tendency of the movement may be determined using any existing methods in the art. For example, supposing the user input is a movement of the user's finger, the movement of the user's finger can be sensed through changes of a capacitance or resistance of the input device to determine the position of the user's finger, and thereby to determine the tendency of the movement. According to an embodiment of the present invention, the tendency of the movement may be the direction of the movement. According to the received user input, first the current position of the user's finger may be determined, then the position of user's finger at a next time may be determined (i.e., the tendency of the movement describes the velocity of the movement), and the tendency of the movement may be determined according to the relationship between the current position and the position at the next time (i.e., the tendency of the movement describes a direction of the movement). Alternatively, according to the received user input, first the starting position of user's finger may be determined, then the stop position of user's finger may be determined, and the tendency of the movement may be determined according to the relationship between the starting position and the stop position.

Next, method 200 proceeds to step 208, in which according to the tendency of the movement, a value of at least one of a plurality of conditions is adjusted by using a plurality of graphs representing the plurality of conditions, and the plurality of graphs representing the plurality of conditions have a common starting point and are radial. According to an embodiment of the present invention, the plurality of graphs representing the plurality of conditions are a plurality of line segments with the common starting point as the starting point. According to an embodiment of the present invention, the user input is a movement along a line segment. Method 200 further comprises: determining a stop position of the movement, and determining the value according to the length of the line segment from the common starting point to the stop position.

Figure 4A:
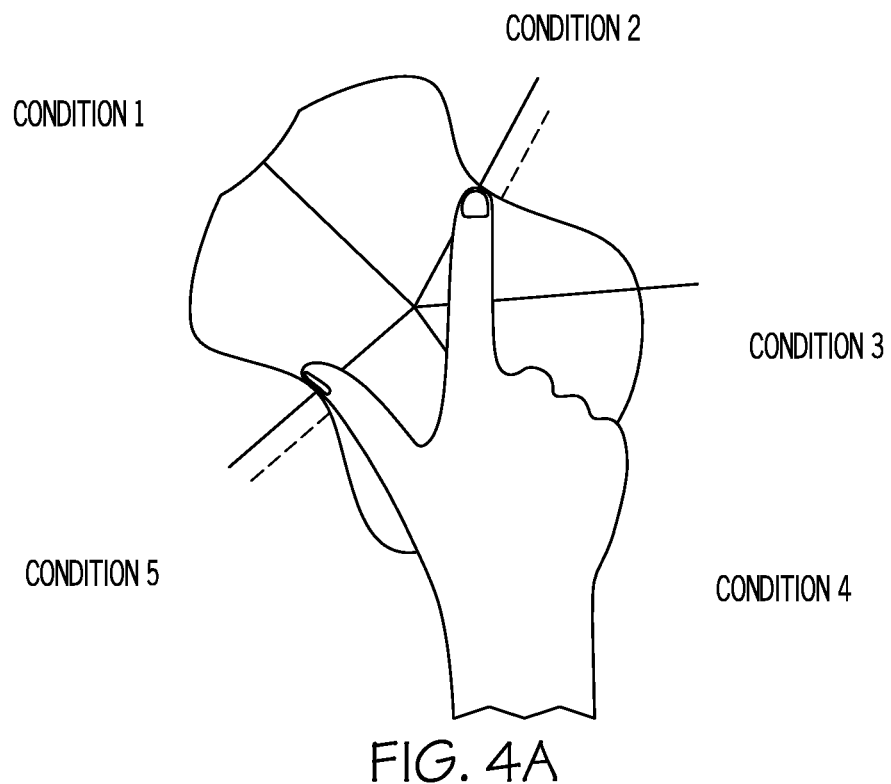
FIGS. 4a-4b show graphs implemented by a method for adjusting values of a plurality of conditions according to the embodiments of the present invention.

FIG. 4a shows an example according to the above embodiment of the present invention. According to an embodiment of the present invention, the graphs representing the plurality of conditions are a plurality of sectors with the common starting point as the center of the circle. According to an embodiment of the present invention, the user input is a movement along the radius of a sector. Method 200 further comprises: determining a stop position of the movement, and determining the value according to the sector with the line segment from the circle of center to the stop position as the radius.

Figure 4B:
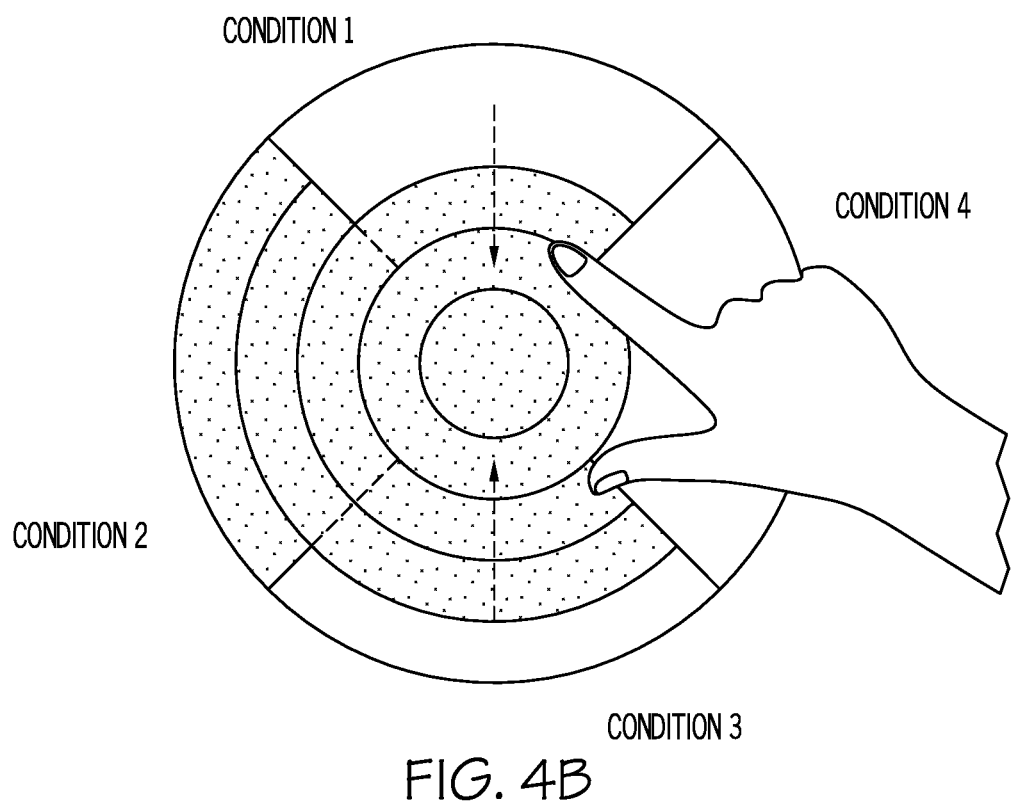

FIG. 4b shows an example according to the above embodiment of the present invention. It should be understood that the examples shown in FIGS. 4a, 4b are only exemplary, and any other suitable methods may be used, as long as the graphs representing the plurality of conditions have a common starting point and are radial. According to an embodiment of the present invention, in response to that the tendency of the movement determined according to the user input is to leave away from the common starting point, the value of the condition is increased. In response to that the tendency of the movement determined according to the user input is to get closer to the common starting point, the value of the condition is reduced.

According to an embodiment of the present invention, there is provided a user interface for displaying a plurality of conditions, comprising: using a plurality of graphs to represent the plurality of conditions, wherein the plurality of graphs have a common starting point and are radial. According to an embodiment of the present invention, the plurality of graphs are a plurality of line segments with the common starting point as the starting point, and the length of the line segment is value of the condition. The lengths of a plurality of line segments may be in a linear relationship, or they may be disproportionate. According to an embodiment of the present invention, the plurality of graphs are a plurality of sectors with the common starting point as the center of the circle, and the area of the sector is the value of the condition. The areas of a plurality of sectors may be in a linear relationship, or they may be disproportionate.

Figure 3:
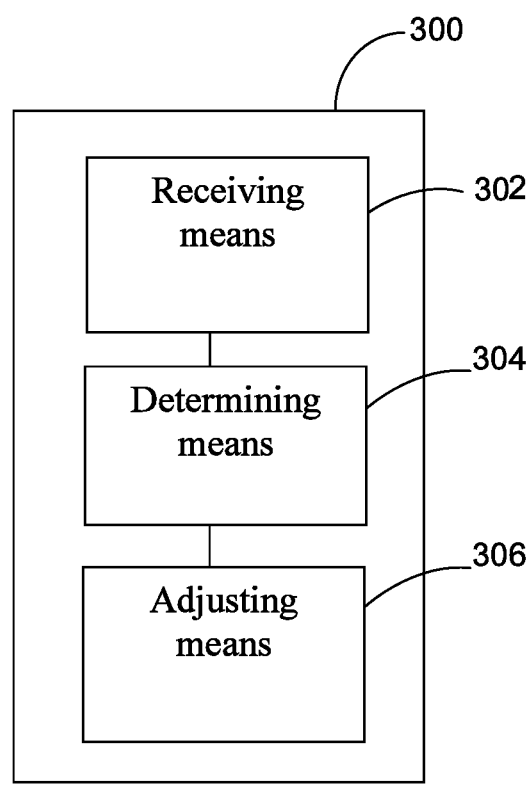
FIG. 3 shows a block diagram of system 300 for adjusting values of a plurality of conditions according to an embodiment of the present invention.

Referring to FIG. 3, a block diagram of system 300 for adjusting values of a plurality of conditions according to an embodiment of the present invention is shown. System 300 for adjusting values of a plurality of conditions comprises: receiving means 302 configured to receive a user input, which is a movement; determining means 304 configured to determine the tendency of the movement; adjusting means 306 configured to, according to the tendency of the movement, adjust a value of at least one of the plurality of conditions by using a plurality of graphs representing the plurality of conditions; wherein: the plurality of graphs representing the plurality of conditions have a common starting point and are radial. According to an embodiment of the present invention, the user input may be input through a touch input device such as a touch screen, touch pad, etc. . . . According to an embodiment of the present invention, the user input is a movement of the user's finger; according to an embodiment of the present invention, it may be movements of the user's plurality of fingers. According to an embodiment of the present invention, the user movement may be a movement of a pen which is used as the input device. Receiving means 302 may receive the user input through a touch input device such as a touch screen, touch pad, by using various known technical means, which is not repeated here.

According to an embodiment of the present invention, determining means 304 may use any known methods in the art to determine the tendency of the movement. For example, supposing the user input is a movement of the user's finger, the movement of the user's finger can be sensed through changes of a capacitance or resistance of the input device, to determine the position of the user's finger, and thereby to determine the tendency of the movement. According to an embodiment of the present invention, the tendency of the movement may be the direction of the movement. According to the received user input, first the current position of the user's finger may be determined, then the position of the user's finger at a next time may be determined, and the tendency of the movement may be determined according to the relationship between the current position and the position at the next time. Alternatively, according to the received user input, first the starting position of user's finger may be determined, then the stop position of user's finger may be determined, and the tendency of the movement may be determined according to the relationship between the starting position and the stop position. According to an embodiment of the present invention, the plurality of graphs representing the plurality of conditions are a plurality of line segments with the common starting point as the starting point. According to an embodiment of the present invention, the user input is a movement along the line segment, and determining means 304 is further configured to determine the stop position of the movement, and determine the value according to the length of the line segment from the starting point to the stop position.

FIG. 4*a* shows an example according to the above embodiment of the present invention. According to an embodiment of the present invention, the plurality of graphs representing the plurality of conditions are a plurality of sectors with the common starting point as the center of the circle. According to an embodiment of the present invention, the user input is a movement along the radius of the sector, and determining means 304 is further configured to determine a stop position of the movement, and the value is determined according to the sector with the line segment from the center of the circle to the stop position as the radius.

FIG. 4*b* shows one example according to the above embodiment of the present invention. It should be understood that the examples given in FIGS. 4*a*, 4*b* are only exemplary, and any other suitable methods may be used, as long as the graphs representing the plurality of conditions have a common starting point and are radial. According to an embodiment of the present invention, adjusting means 306 is further configured to, in response to that the tendency of the movement determined according to the user input is to leave away from the common starting point; the value of the condition is increased. The adjusting means 306 is further configured to, in response to that the tendency of the movement determined according to the user input is to get closer to the common starting point, the value of the condition is reduced.

As described herein, illustrative embodiments of the present invention provide a method and system for adjusting values of a plurality of conditions, and can adjust values of a plurality of conditions simultaneously.

According to an aspect of the present invention, there is provided a method for adjusting values of a plurality of conditions, comprising: receiving a user input, which is a movement; determining the tendency of the movement; according to the tendency of the movement, adjusting a value of at least one of the plurality of conditions by using a plurality of graphs representing the plurality of conditions; wherein the plurality of graphs representing the plurality of conditions have a common starting point and are radial According to an aspect of the present invention, there is provided a system for adjusting values of a plurality of conditions, comprising: receiving means configured to receive a user input, which is a movement; determining means configured to determine the tendency of the movement; adjusting means configured to, according to the tendency of the movement, adjust a value of at least one of the plurality of conditions by using a plurality of graphs representing the plurality of conditions; wherein the plurality of graphs representing the plurality of conditions have a common starting point and are radial According to an aspect of the present invention, there is provided a user interface for displaying a plurality of conditions, comprising: using a plurality of graphs to represent the plurality of conditions, wherein the plurality of graphs have a common starting point and are radial.

According to another aspect of the present invention, there is provided a computer program product for adjusting values of a plurality of conditions.

Using one or more embodiments of the present invention can achieve the objective of adjusting values of a plurality of conditions simultaneously.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adjusting values of a plurality of conditions, the method comprising:
   receiving, by one or more processors, a user input, wherein the user input is a movement across a user interface;
   determining, by one or more processors, a tendency of the movement, wherein the tendency of the movement describes a direction and velocity of the movement; and
   according to the tendency of the movement, adjusting, by one or more processors, a value of at least one of the plurality of conditions by using a plurality of graphs representing the plurality of conditions, wherein the plurality of conditions describe search criteria, wherein the user input describes the search criteria, wherein the plurality of graphs representing the plurality of conditions are a plurality of sectors having a center of a circle as a common starting point, and wherein the movement is a movement along a radius of one of the sectors, and wherein the method further comprises:
   determining, by one or more processors, a stop position of the movement; and
   determining, by one or more processors, a value of at least one of the plurality of conditions described by said one of the sectors according to an area of said one of the sectors.

2. The method of claim 1, further comprising:
in response to determining that the tendency of the movement that describes a direction and velocity of the movement is to move away from the common starting point, increasing a value of a corresponding condition; and
in response to determining that the tendency of the movement that describes a direction and velocity of the movement is to move closer to the common starting point, reducing the value of the corresponding condition.

3. The method of claim 2, wherein the user input is a movement of at least two fingers of a user across the user interface for which a tendency thereof that describes the direction and the velocity of the movement is specially determined, and wherein the value is the value of at least two of the plurality of condition that are simultaneously adjusted according to the tendency of the movement.

4. The method of claim 3, wherein each sector of the plurality of sectors represents a given condition of the plurality of conditions.

5. The method of claim 1, wherein each sector of the plurality of sectors represents a given condition of the plurality of conditions.

6. A computer program product for adjusting values of a plurality of conditions, the computer program product comprising a computer readable storage medium having program code embodied therewith, the program code readable and executable by a processor to perform a method comprising:
receiving a user input, wherein the user input is a movement across a user interface;
determining a tendency of the movement, wherein the tendency of the movement describes a direction and velocity of the movement; and
according to the tendency of the movement, adjusting a value of at least one of the plurality of conditions by using a plurality of graphs representing the plurality of conditions, wherein the plurality of conditions describe search criteria, wherein the user input describes the search criteria, wherein the plurality of graphs representing the plurality of conditions are a plurality of sectors having a center of a circle as a common starting point, and wherein the movement is a movement along a radius of one of the sectors, and wherein the method further comprises:
determining, by one or more processors, a stop position of the movement; and
determining, by one or more processors, a value of at least one of the plurality of conditions described by said one of the sectors according to an area of said one of the sectors.

7. The computer program product of claim 6, wherein the method further comprises:
in response to determining that the tendency of the movement that describes a direction and velocity of the movement is to move away from the common starting point, increasing a value of a corresponding condition; and
in response to determining that the tendency of the movement that describes a direction and velocity of the movement is to move closer to the common starting point, reducing the value of the corresponding condition.

8. The computer program product of claim 7, wherein the user input is a movement of at least two fingers of a user across the user interface for which a tendency thereof that describes the direction and the velocity of the movement is specially determined, and wherein the value is the value of at least two of the plurality of condition that are simultaneously adjusted.

9. The computer program product of claim 8, wherein each sector of the plurality of sectors represents a given condition of the plurality of conditions.

10. The computer program product of claim 6, wherein each sector of the plurality of sectors represents a given condition of the plurality of conditions.

11. A computer system comprising:
a processor, a computer readable memory, and a computer readable storage medium;
first program instructions to receive a user input, wherein the user input is a movement across a user interface;
second program instructions to determine a tendency of the movement, wherein the tendency of the movement describes a direction and velocity of the movement; and
third program instructions to, according to the tendency of the movement, adjust a value of at least one of the plurality of conditions by using a plurality of graphs representing the plurality of conditions, wherein the plurality of conditions describe search criteria, and wherein the user input describes the search criteria, wherein the plurality of graphs representing the plurality of conditions are a plurality of sectors having a center of a circle as a common starting point, and wherein the movement is a movement along a radius of one of the sectors, and wherein the computer system further comprises:
fourth program instructions to determine a stop position of the movement; and
fifth program instructions to determine a value of at least one of the plurality of conditions described by said one of the sectors according to an area of said one of the sectors; and wherein
the first, second, third, fourth and fifth program instructions are stored on the computer readable storage medium, and wherein the first, second, third, fourth and fifth program instructions are executed by the processor via the computer readable memory.

12. The computer system of claim 11, further comprising:
sixth program instructions to, in response to determining that the tendency of the movement that describes a direction and velocity of the movement is to move away from the common starting point, increase a value of a corresponding condition; and
seventh program instructions to, m response to determining that the tendency of the movement that describes a direction and velocity of the movement is to move closer to the common starting point, reduce the value of the corresponding condition; and wherein
the sixth and seventh program instructions are stored on the computer readable storage medium, and wherein the sixth and seventh program instructions are executed by the processor via the computer readable memory.

13. The computer system of claim 12, wherein the user input is a movement of at least two fingers of a user across the user interface for which a tendency thereof that describes the direction and the velocity of the movement is specially determined, and wherein the value is the value of at least two of the plurality of condition that are simultaneously adjusted.

14. The computer system of claim 13, wherein each sector of the plurality of sectors represents a given condition of the plurality of conditions.

15. The computer system of claim 11, wherein each sector of the plurality of sectors represents a given condition of the plurality of conditions.

* * * * *